United States Patent
Machida et al.

(10) Patent No.: US 10,934,207 B2
(45) Date of Patent: Mar. 2, 2021

(54) METHODS FOR PRODUCING AN ASSEMBLY OF HEXABORIDE FINE PARTICLES

(71) Applicant: SUMITOMO METAL MINING CO., LTD., Tokyo (JP)

(72) Inventors: Keisuke Machida, Ichikawa (JP); Hirofumi Tsunematsu, Isa (JP); Kenichi Fujita, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/581,844

(22) Filed: Sep. 25, 2019

(65) Prior Publication Data

US 2020/0017401 A1    Jan. 16, 2020

Related U.S. Application Data (62) Division of application No. 15/507,689, filed as application No. PCT/JP2015/074450 on Aug. 28, 2015, now abandoned.

(30) Foreign Application Priority Data

Aug. 29, 2014    (JP) .................. 2014-176608

(51) Int. Cl.
*C01B 35/04*    (2006.01)
*C03C 17/00*    (2006.01)
(Continued)

(52) U.S. Cl.
CPC ............ *C03C 17/007* (2013.01); *B32B 27/20* (2013.01); *C01B 35/04* (2013.01); *C03C 17/32* (2013.01);
(Continued)

(58) Field of Classification Search
CPC ................................ C01B 35/04; C01F 17/30
See application file for complete search history.

(56) References Cited

U.S. PATENT DOCUMENTS 6,319,613 B1    11/2001  Takeda et al.
2004/0071957 A1    4/2004  Fujita
(Continued)

FOREIGN PATENT DOCUMENTS

JP    H02-136230 A    5/1990
JP    H08-259279 A    10/1996
(Continued)

OTHER PUBLICATIONS

Translation of JP 2008-178822 (2008) (Year: 2008).*
(Continued)

*Primary Examiner* — Robert C Boyle
(74) *Attorney, Agent, or Firm* — Oliff PLC (57) ABSTRACT

Methods for providing new transparent near infrared absorptive fine particles having a wide range of near infrared absorption, which are an assembly of hexaboride fine particles, where when a particle shape of the number of particles contained in the assembly is approximately regarded as a spheroid body, there are 20% or more and less than 80% of particles having an aspect ratio [(long axis length)/(short axis length)] of 1.5 or more and less than 5.0, and there are 20% or more and less than 80% of particles having an aspect ratio of 5.0 or more and less than 20.0.

5 Claims, 4 Drawing Sheets

(51) Int. Cl.
  *C03C 17/32*    (2006.01)
  *C08K 3/38*    (2006.01)
  *C09K 3/00*    (2006.01)
  *B32B 27/20*    (2006.01)
  *C08L 101/00*    (2006.01)
  *C09D 5/32*    (2006.01)

(52) U.S. Cl.
  CPC .............. *C08K 3/38* (2013.01); *C08L 101/00* (2013.01); *C09D 5/32* (2013.01); *C09K 3/00* (2013.01); *C01P 2004/54* (2013.01); *C01P 2004/64* (2013.01); *C03C 2217/475* (2013.01)

(56) References Cited

U.S. PATENT DOCUMENTS

| | | | |
|---|---|---|---|
| 2008/0182930 A1* | 7/2008 | Adachi | B29C 66/73921 524/403 |
| 2014/0335364 A1 | 11/2014 | Fujita et al. | |

FOREIGN PATENT DOCUMENTS

| | | | |
|---|---|---|---|
| JP | H11-181336 A | | 7/1999 |
| JP | 2000-096034 A | | 4/2000 |
| JP | 2004-162020 A | | 6/2004 |
| JP | 2004-237250 | * | 8/2004 |
| JP | 2004-237250 A | | 8/2004 |
| JP | 2008-178822 | * | 8/2008 |
| JP | 2008-178822 A | | 8/2008 |
| JP | 2009-265485 A | | 11/2009 |
| JP | 2010-202495 A | | 9/2010 |
| JP | 2012-517517 A | | 8/2012 |
| JP | 2014-224921 A | | 12/2014 |
| WO | 2013/080859 A1 | | 6/2013 |

OTHER PUBLICATIONS

Translation of JP 2004-237250 (2004) (Year: 2004).*
Oct. 6, 2015 International Search Report issued in International Patent Application No. PCT/JP2015/74450.
Machida et al., "Particle Shape Inhomogenity and Phasmon-band Broadening of Solar-conrol LaB6 Nanoparticles", Journal of Applied Physics, vol. 118, pp. 013103-1-013103-10, published 2015.
Machida, Journal of Applied Physics, 118, 013103 (2015) (Year:2015).
H. Takeda et al. "Solar Control Dispersion and Coatings with Rare-Earth Hexaboride Nanoparticles." Journal of the American Ceramic Society. vol. 91, No. 9, Sep. 2, 2008, pp. 2897-2902.
K. M. Mayer et al. "Localized Surface Plasmon Resonance Sensors." Chemical Reviews. vol. 111, No. 6, Jun. 8, 2011, pp. 3828-3857.
K. Adachi et al. "Absorption and scattering of near-infrared light by dispersed lanthanum hexaboride nanoparticles for solar control filters." Journal of Materials Research. vol. 25, No. 3, Mar. 2010, pp. 510-521.

* cited by examiner

METHODS FOR PRODUCING AN ASSEMBLY OF HEXABORIDE FINE PARTICLES

This Application is a Divisional of U.S. application Ser. No. 15/507,689 filed Feb. 28, 2017, which in turn is a National Stage Application of PCT/JP2015/074450 filed Aug. 28, 2015, which claims the benefit of Japanese Application No. 2014-176608 (filed Aug. 29, 2014). The disclosures of the prior applications are hereby incorporated by reference herein in their entireties.

TECHNICAL FIELD

The present invention relates to an assembly of hexaboride fine particles, a hexaboride fine particle dispersion, a hexaboride fine particle-dispersed body, a laminated transparent base material using the hexaboride fine particle-dispersed body, an infrared-absorptive film and an infrared-absorptive glass.

DESCRIPTION OF THE RELATED ART

Various techniques have been proposed as a heat ray-shielding technique of reducing a solar transmittance while having an excellent visible light transmittance and maintaining transparency. Above all, the heat ray-shielding technique using a conductive fine particle-dispersed body has a merit such as excellent heat ray-shielding properties, a low cost, a radio wave transparency, and further a high weather resistance, or the like, compared with other techniques.

For example, patent document 1 discloses an infrared ray absorbing synthetic resin molding formed by laminating on a transparent synthetic resin base material, a transparent resin containing a tin oxide fine powder in a dispersed state, and a material obtained by molding a transparent synthetic resin containing the tin oxide fine powder in a dispersed state into a sheet or a film.

Also, patent document 2 discloses a laminated glass with an intermediate layer interposed between at least two opposing plate glasses, the intermediate layer being formed in a dispersion state of metal such as Sn, Ti, Si, Zn, Zr, Fe, Al, Cr, Co, Ce, In, Ni, Ag, Cu, Pt, Mn, Ta, W, V, and Mo, oxide of this metal, nitride of this metal, sulfide of this metal, and the metal doped with Sb or F, or further a composite of them.

Further, patent document 3 to 5 disclose a selective permeable film coating solution in which titanium nitride fine particles or hexaboride fine particles are dispersed, a selectively permeable film, a heat ray shielding component dispersion, a heat ray shielding resin molded body, or the like.

Patent document 1: Japanese Patent Laid Open Publication No. 1990-136230
Patent document 2: Japanese Patent Laid Open Publication No. 1996-259279
Patent document 3: Japanese Patent Laid Open Publication No. 1999-181336
Patent document 4: Japanese Patent Laid Open Publication No. 2000-96034
Patent document 5: Japanese Patent Laid Open Publication No. 2004-162020

SUMMARY OF THE INVENTION

Problem to be Solved by the Invention

According to the investigation by the inventors of the present invention, it is found that a heat ray-shielding structure such as the infrared absorptive synthetic resin molded product, etc., disclosed in patent documents 1 and 2 has a problem that a shielding performance is not sufficient when a high visible light transmittance is requested.

Here, the inventors of the present invention reach an idea of hexaboride fine particles as light absorbing fine particles and a dispersion of the hexaboride fine particles. That is, the inventors of the present invention obtain a knowledge that the hexaboride fine particles and the hexaboride fine particle dispersed body has a strong capability of absorbing near infrared while maintaining high transparency, at a low cost while having a high molar extinction coefficient, and has a high weather resistance, and such hexaboride fine particles and dispersion of the hexaboride fine particles can be used as a light absorbing fine particle dispersion and a light absorbing fine particle dispersed body.

Based on the above idea, the present applicant discloses the abovementioned patent documents 3 to 5, and provide a coating solution for selective transmission film, and a selective transmission film in which titanium nitride fine particles or hexaboride fine particles are dispersed, a heat ray-shielding component dispersed body, a heat ray-shielding resin molding and the like.

However, as a result of further investigation by the inventors of the present invention, the following problem is found.

That is, the hexaboride fine particles disclosed in patent documents 3 to 5 sometimes cannot sufficiently absorb the light having a high weighting coefficient in the wavelength of around 1000 nm in the solar light. Therefore, when the concentration of the hexaboride fine particles is increased so as to sufficiently absorb the light in the vicinity of the wavelength of 1000 nm, light in the visible light region is also largely absorbed. For this reason, properties as a solar radiation shielding material that transmits visible light but shields the solar light sometimes become insufficient.

In order to solve this problem, for example, patent document 4 discloses a configuration in which light absorbing fine particles other than hexaboride fine particles are mixed with hexaboride fine particles. However, mixing and using light-absorbing fine particles of different types makes it difficult to select a dispersant capable of stably presenting plural types of light-absorbing fine particles in a solvent and select a method of addition, and furthermore, there is a possibility that aggregation of the light absorbing fine particles occurs during mixture. As a result, there are various quality control problems such that a difficult mixing and dispersing operation must be sufficiently performed for the light absorbing fine particles and the dispersant; an influence on a medium such as the resin, etc., which will finally contain the light absorbing fine particles is different in each type of the light absorbing fine particles; and a progress state of an aging variation is different in each type of the light absorbing fine particles.

Under the abovementioned circumstance, the present invention is made, and an object of the present invention is to provide an assembly of hexaboride fine particles, a hexaboride fine particle dispersion, a hexaboride fine particle-dispersed body, a laminated transparent base material using the hexaboride fine particle-dispersed body, an infrared-absorptive film, and an infrared-absorptive glass, in which selectivity of an absorption wavelength is controlled and which has a sufficient property as a solar radiation shielding material for shielding a solar light.

Means for Solving the Problem

In order to solve the abovementioned problem, inventors of the present invention perform intensive studies.

As a result, it is found that no consideration has been made on the configuration of controlling the shape of the fine particles in hexaboride fine particles known hitherto or in the hexaboride fine particle-dispersed body according to the prior art in which the hexaboride fine particles are applied.

It is found that the reason why the hexaboride fine particles don't sufficiently absorb the light having a high weighting coefficient in the vicinity of the wavelength of 1000 nm in the solar light, is that the shapes of the formed particles and the existence ratio of each shaped particle are inappropriate, because control of the shape of the particles is not taken into consideration in granulating the hexaboride fine particles.

For example, the abovementioned patent document 3 and patent document 5 simply disclose a procedure of preparing a lanthanum boride fine particle dispersion by mixing lanthanum boride fine particles ($LaB_6$) having an average particle size of 100 nm or less with an organic solvent and a silane coupling agent, and performing ball mill mixture for 100 hours using a zirconia ball having a diameter of 4 mm, and no particular reference is made to the shape of the particles in the form of dispersions or coating films or dispersed bodies.

Further patent document 4 similarly discloses a procedure of preparing the hexaboride fine particle dispersion by mixing the hexaboride fine particles having an average particle size of 85 to 120 nm with an organic solvent and a silane coupling agent, and performing ball mill mixture using a zirconia ball having a diameter of 4 mm, and no particular reference is made to the shape of the particles in the form of dispersions or a coating films or dispersed bodies.

Further, in other known document, the description regarding the control of the particle shape of the hexaboride and the effect thereof does not substantially exceed a range of the description of patent documents 3 to 5. That is, by adopting a configuration in which each fine particle of the hexaboride fine particles is controlled to have a predetermined shape, light absorption property exhibited by the dispersed body when the hexaboride fine particle is used as the dispersed body, is not clear at all.

Here, the inventors of the present invention perform further intensive studies based on the above recognition.

Although details are described later, when the aspect ratio of the hexaboride fine particles is considered, with the particle shape of the hexaboride fine particles regarded as a spheroid body, it is found that the hexaboride fine particles having the aspect ratio of 1.5 or more and less than 4.0 have a main absorption peak in the light with a wavelength of 900 to 1000 nm. Accordingly, it is possible to efficiently shield solar light while transmitting visible light. However, it is also found that the hexaboride fine particles can not sufficiently absorb the light having a wavelength of longer than 1100 nm where the weighting coefficient of the solar light is high.

It is also found that the hexaboride fine particles having the aspect ratio of 4.0 or more and less than 20.0 have a main absorption peak in the light having a wavelength of 1000 to 2000 nm, so that visible light can be transmitted while sunlight can be efficiently shielded. However, it is also found that the hexaboride fine particles can not sufficiently absorb the light having a wavelength of 800 to 1000 nm where the weighting coefficient of the solar light is high.

On the other hand, the hexaboride fine particles having an aspect ratio of less than 1.5 have their main absorption peak at a wavelength of 700 to 900 nm. Therefore, such hexaboride fine particles don't sufficiently absorb the light in the vicinity of the wavelength of 1,000 nm where the solar light weighting coefficient is sufficiently high, and absorbs the light in the visible light region. Therefore, properties as a solar radiation shielding material are not satisfactory.

Based on the above knowledge, it is found by the inventors of the present invention, that an assembly of hexaboride fine particles having a wide absorption in a near infrared region where the solar light weighting coefficient is high while transmitting visible light can be obtained, by mixing the hexaboride fine particles having the aspect ratio of 1.5 or more and less than 4.0 and the hexaboride fine particles having the aspect ratio of 4.0 or more and less than 20.0 at a predetermined ratio to obtain the assembly.

Specifically, in the assembly of hexaboride fine particles or a dispersed body thereof present within a field of view of a predetermined TEM tomography image, the particle shape of the hexaboride fine particles present in this field of view is regarded as a spheroid body, and the number of all hexaboride fine particles present in this field of view is 100 (number) %, and the ratio of the numbers occupied by the hexaboride fine particles whose aspect ratio [(long axis length)/(short axis length)] value is 1.5 or more and less than 4.0 is set to a (number) %, and the ratio of the number occupied by the hexaboride fine particles whose aspect ratio value is 4.9 or more and less than 10.0 is set to b (number) %. In this case, the values of a and b satisfy 60 (number) %≤(a+b) (number) %≤100 (number) % and a:b=20:80 to 80:20. In this case, it is found that the solar radiation shielding property of the hexaboride fine particle assembly and the dispersed body in which the hexaboride fine particle assembly is dispersed is significantly satisfactory.

In the present invention, the term "assembly" is used as a concept indicating a state in which a plurality of fine particles having each form exist in the same space and a state thereof. On the other hand, according to the present invention, the term "assembly" is not used as a concept indicating the assembly formed by a plurality of fine particles, and the state thereof.

Namely, in order to solve the abovementioned problem, a first invention is an assembly of hexaboride fine particles, wherein when a particle shape of the hexaboride fine particles contained in the assembly is regarded as a spheroid body, and when the number ratio of the hexaboride fine particles contained in the assembly and having an aspect ratio [(long axis length)/(short axis length)] of 1.5 or more and less than 4.0 is expressed as a (number) %, and the number ratio of hexaboride fine particles contained in the assembly and having an aspect ratio [(long axis length)/(short axis length)] of 4.0 or more and less than 20.0 is expressed as b (number) %, 60 (number) %≤(a+b) (number) %≤100 (number) %, and a:b=20:80 to 80:20 are satisfied.

A second invention is the assembly of hexaboride fine particles of the first invention, wherein the hexaboride fine particles contained in the assembly of the hexaboride fine particles have an average dispersed particle size of 1 nm or more and 100 nm or less.

A third invention is the assembly of hexaboride fine particles of the first invention or the second invention, wherein the hexaboride fine particles are lanthanum hexaboride fine particles.

A fourth invention is a hexaboride fine particle dispersion, containing the assembly of the hexaboride fine particles of any one of the first to third inventions in a state of being dispersed in a liquid medium, the liquid medium being selected from water, an organic solvent, an oil and fat, a liquid resin, a liquid plasticizer for a plastic, or a mixture of two or more selected from them.

A fifth invention is the hexaboride fine particle dispersion of the fourth invention, wherein the assembly of the hexaboride fine particles are contained in an amount of 0.02 mass % or more and 20 mass % or less.

A sixth invention is a hexaboride fine particle-dispersed body, wherein the assembly of the hexaboride fine particles of any one of the first invention to the fourth invention are dispersed in a thermoplastic resin or a UV curable resin.

A seventh invention is the hexaboride fine particle-dispersed body of the sixth invention, wherein the thermoplastic resin is one kind of resin selected from the group consisting of polyethylene terephthalate resin, polycarbonate resin, acrylic resin, styrene resin, polyamide resin, polyethylene resin, vinyl chloride resin, olefin resin, epoxy resin, polyimide resin, fluororesin, ethylene vinyl acetate copolymer, and polyvinyl acetal resin; or a mixture of two or more kinds of resins selected from the resin group; or a copolymer of two or more kinds of resins selected from the resin group.

An eighth invention is the hexaboride fine particle-dispersed body of the sixth or seventh invention, wherein the assembly of the hexaboride fine particles are contained in an amount of 0.001 mass % or more and 80.0 mass % or less.

A ninth invention is the hexaboride fine particle-dispersed body of any one of the sixth to eighth inventions, wherein the hexaboride fine particle-dispersed body has a sheet shape, a board shape, or a film shape.

A tenth invention is the hexaboride fine particle-dispersed body of any one of the sixth to ninth inventions, wherein the content of the hexaboride fine particle-dispersed body per unit projected area contained in the hexaboride fine particle-dispersed body is 0.01 $g/m^2$ or more and 0.5 $g/m^2$ or less.

An eleventh invention is a laminated transparent base material using hexaboride fine particle-dispersed body, wherein the hexaboride fine particle-dispersed body of any one of the sixth to tenth inventions is present between a plurality of transparent base materials.

A twelfth invention is an infrared absorptive film or an infrared absorptive glass, wherein the hexaboride fine particle-dispersed body of any one of the sixth to tenth inventions is provided as a coating layer on at least one side of a transparent base material selected from a transparent film base material or a transparent glass base material.

A thirteenth invention is an infrared absorptive film or an infrared absorptive glass of the twelfth invention, wherein the resin is a UV curable resin.

A fourteenth invention is the infrared absorptive film or the infrared absorptive glass of the twelfth or thirteenth invention, wherein the thickness of the coating layer is 10 μm or less.

A fifteenth invention is the infrared absorptive film of any one of the twelfth to fourteenth inventions, wherein the transparent film base material is a polyester film.

A sixteenth invention is the infrared absorptive film or the infrared absorptive glass of any one of the twelfth to fifteenth inventions, wherein the content of the assembly of the hexaboride fine particles per unit projected area included in the coating layer is 0.01 $g/m^2$ or more and 0.5 $g/m^2$ or less.

ADVANTAGE OF THE INVENTION

The hexaboride fine particle assembly, the hexaboride fine particle dispersion, the hexaboride fine particle-dispersed body, the transparent base material using the hexaboride fine particle-dispersed body, and the infrared absorptive film and the infrared absorptive glass, have wide absorption properties in the near infrared wavelength region while using the hexaboride fine particles, and have appropriate properties as a solar radiation shielding material.

DETAILED DESCRIPTION OF THE INVENTION

Embodiments of the present invention will be described hereafter in an order of [a] Hexaboride fine particles, [b] Assembly of the hexaboride fine particles, [c] Method for producing the assembly of the hexaboride fine particles, [d] Hexaboride fine particle dispersion and a method for producing the same, [e] Hexaboride fine particle dispersed body and a method for producing the same, [f] Sheet-like or film-like hexaboride fine particle dispersed body and a method for producing the same, [g] Transparent base material using the hexaboride fine particle dispersed body and a method for producing the same, and [h] Infrared absorptive film and infrared absorptive glass and a method for producing the same.

[a] Hexaboride Fine Particles

The hexaboride fine particles used in the present invention exhibit light absorption by plasmon absorption in the near-infrared region. Its component is represented by the general formula $XB_6$, and its shape has a nonspherical shape. Here, element X is at least one element selected from La, Ce, Pr, Nd, Gd, Tb, Dy, Ho, Y, Sm, Eu, Er, Tm, Yb, Lu, Sr and Ca. Lanthanum hexaboride [$LaB_6$], cerium hexaboride [$CeB_6$], praseodymium hexaboride [$PrB_6$], neodymium hexaboride [$NdB_6$], gadolinium hexaboride [$GdB_6$], terbium hexaboride [$TbB_6$], dysprosium hexaboride [$DyB_6$], holmium hexaboride [$HoB_6$], yttrium hexaboride [$YB_6$], samarium hexaboride [$SmB_6$], europium hexaboride [$EuB_6$], erbium hexaboride [$ErB_6$], thulium hexaboride [$TmB_6$], ytterbium hexaboride [$YbB_6$], lutetium hexaboride [$LuB_6$], strontium hexaboride [$SrB_6$], calcium hexaboride [$CaB_6$] and the like can be mentioned as representative ones. Among them, lanthanum hexaboride [$LaB_6$] is preferably used, because the intensity of a near infrared absorption is higher than the intensity of a visible light absorption.

In the hexaboride fine particles used in the present invention, it is preferable that the surface thereof is not oxidized, but usually it is oxidized slightly. In addition, it is inevitable that a certain extent of oxidation of the surface occurs in a dispersion process of hexaboride fine particles. However, even in this case, there is no change in the effectiveness of exhibiting the near infrared shielding effect. Therefore, for example even the hexaboride fine particles whose surface is oxidized can be used as the hexaboride fine particles used in the present invention.

Further, as the hexaboride fine particles used in the present invention, the higher the integrity as a crystal is, the greater the heat ray shielding effect is. However, even in a case of the hexaboride fine particles whose crystallinity is low and a broad diffraction peak is generated by X-ray diffraction, when the basic bond inside the fine particle is composed of a bond between each metal and boron, the heat ray shielding effect is exhibited, and such hexaboride fine particles can be applied in the present invention. It should be noted that the ratio of metal to boron as hexaboride need not be strictly 6, and may be in a range of 5.8 to 6.2.

[b] Assembly of the Hexaboride Fine Particles

The assembly of the hexaboride fine particles according to the present invention is composed of an assembly of hexaboride fine particles having a particle shape in a predetermined range.

Here, the features of the hexaboride fine particles contained in the assembly of the hexaboride fine particles will be described with reference to FIG. 1 which is a TEM tomographic image of a lanthanum hexaboride fine particle assembly according to example 1 described later. As shown in the method for producing a hexaboride fine particle dispersion and the method for producing a hexaboride fine particle dispersed body, which will be described later, it is apparent that the properties of the hexaboride fine particles contained in the assembly of the hexaboride fine particles coincide with the properties of the hexaboride fine particles in the hexaboride fine particle dispersion and the hexaboride fine particle dispersed body.

First, the particle shape of the hexaboride fine particles contained in the assembly is regarded as a spheroid body, and the aspect ratio [(long axis length)/(short axis length)] of the hexaboride fine particles is considered.

At this time, when the number ratio of hexaboride fine particles having the aspect ratio of 1.5 or more and less than 4.0 contained in the assembly is expressed by a (number) %, and the number ratio of the hexaboride particles having the aspect ratio [(long axis length)/(short axis length)] of 4.0 or more and less than 20.0 is expressed by b (number) %, the value of (a+b) (number) % is 60 (number) % or more and 100 (number) % or less. Then, the ratio of a:b is in a range of 20:80 to 80:20, more preferably in a range of 30:70 to 70:30.

The aspect ratio of the hexaboride fine particles is obtained by identifying individual hexaboride fine particles by a three-dimensional image obtained by the TEM tomography method and comparing the specific shape of the particle with a length scale of the three-dimensional image, and calculating the aspect ratio [(long axis length)/(short axis length)] for each hexaboride fine particle.

Specifically, 100 or more, preferably 200 or more hexaboride fine particles are identified from the three-dimensional image. For each identified hexaboride fine particle, directions of the long axis and the short axis are determined (mutually orthogonal axes have a long axis and a short axis), lengths of the long and short axes are measured and the aspect ratio is calculated from the measured value.

As described above, the hexaboride fine particles having the aspect ratio of less than 1.5 have their main absorption peak in a wavelength of 700 to 900 nm. For this reason, the light in the vicinity of 1100 nm where the solar light weighting coefficient is sufficiently high, is not sufficiently absorbed, and the light in the visible light region is absorbed. Therefore, the properties as the solar radiation shielding material are not satisfactory.

On the other hand, the hexaboride fine particles having the aspect ratio of 1.5 or more and less than 4.0 have a main absorption peak in a wavelength of 900 to 1000 nm. Therefore, while the solar light can be efficiently shielded while transmitting the visible light, it is not able to sufficiently absorb the light having a longer wavelength than the wavelength of 1100 nm where the weighting coefficient is high in the solar light.

The hexaboride fine particles having the aspect ratio of 4.0 or more and less than 20.0 have a main absorption peak in light having a wavelength of 1000 to 2000 nm and can efficiently shield the solar light while transmitting the visible light. However, it is still impossible to sufficiently absorb the light with a wavelength of 800 to 1000 nm where the weighting coefficient is high in the solar light.

There are almost no hexaboride fine particles having the aspect ratio of 20.0 or more.

Based on the above knowledge, the inventors of the present invention found that when the value of (a+b) (number) % in the assembly of the hexaboride fine particles is 60 (number) % or more, and the value of the ratio of a:b is in a range of 20:80 to 80:20, the assembly of the hexaboride fine particles of the present invention has wide absorption properties in the near infrared wavelength region while using the hexaboride fine particles as the light absorbing fine particles, and exhibits appropriate properties as the solar radiation shielding material.

[c] Method for Producing the Assembly of the Hexaboride Fine Particles

The assembly of the hexaboride fine particles of the present invention and a method for producing the same will be described. The method for producing the assembly of the hexaboride fine particles is not limited to the example, but can be realized by a method capable of realizing the shape characteristic and a presence ratio of the fine particles constituting the assembly of the hexaboride fine particles of the present invention.

The hexaboride fine particles having an average particle size of 0.5 to 5 μm are prepared, and injected into a mill (for example, a solvent diffusion mill), together with fine grinding media having a lower hardness than the fine particles (hereinafter may be simply referred to as beads), dispersing medium (for example, organic solvents such as isopropyl alcohol, ethanol, 1-methoxy-2-propanol, dimethyl ketone, methyl ethyl ketone, methyl isobutyl ketone, toluene, propylene glycol monomethyl ether acetate, and n-butyl acetate, etc.) and optionally a suitable dispersant (for example, a polymeric dispersant), to thereby perform a beads mill pulverization. At this time, while lowering the peripheral velocity of the mill compared to a normal pulverization (for example, about 0.3 to 0.8 times of the normal operation), and in the presence of a dispersing medium and optionally a suitable dispersant, wet pulverization is performed with a low shear force.

When the particle shape of hexaboride fine particles contained in the assembly of the hexaboride fine particles is regarded as a spheroid body by the wet pulverization with this low shear force, and when the ratio of the number of the hexaboride fine particles whose aspect ratio [(long axis length)/(short axis length)] value contained in this assembly is 1.5 or more and less than 4.0 is set to a (number) %, and the ratio of the number of the hexaboride fine particles whose aspect ratio [(long axis length)/(short axis length)] value contained in this assembly is 4.0 or more and less than 20.0 is set to b (number) %, the assembly satisfying 60 (number) %≤(a+b) (number) %≤100 (number) % and a:b=20:80 to 80:20 can be produced.

The reason why the assembly of the hexaboride fine particles of the present invention can be produced under the above-mentioned production conditions is not clear. However, probably this is because by selecting the hardness of the beads and the peripheral velocity of the bead mill as described above, the mode of destruction of hexaboride fine particles having a cubic crystal structure and extremely high hardness is not in such a manner as to give an impact such as to reach the entire particle to crush it, but in such a manner as to strip off scaly fragments.

On the other hand, the method for preparing coarse (for example, having a particle size of 1 μm or more) hexaboride fine particles, and using a pulverization medium harder than the fine particles, injecting the pulverization medium into the mill together with the dispersing medium and the dispersant, and applying a high peripheral velocity to perform wet-type pulverization with a strong shear force, is not preferable for producing the assembly of the present invention.

This is because a plurality of nearly spherical particles having the aspect ratio of less than 1.5, is contained in the assembly of hexaboride fine particles pulverized under such a strong load.

The reason why the hexaboride fine particles are close to spherical particles having the aspect ratio of less than 1.5 is that the mode of destruction regarding the hexaboride particles is not in such a manner as to peel off scaly fragments having a high aspect ratio from the particle surface, but in such a manner as to apply an impact on the whole particle to crush it.

On the other hand, when the wet-type pulverization is performed to the abovementioned coarse hexaboride fine particles with a low shear force in the presence of the dispersing medium and the dispersant, using the pulverization medium having excessively lower hardness than the hardness of the particle itself, the assembly of the fine particles having a high aspect ratio cannot be produced. This is because when the hardness of the pulverization medium is lower than the hardness of the hexaboride fine particles and the hardness difference between the hexaboride fine particles and the pulverization medium is too large, the pulverization medium itself is pulverized by the hexaboride fine particles before causing the destruction mode to the hexaboride fine particles in such a manner as to peel off the scaly fragments from the surface of the particle, and probably the pulverization force to be added on the hexaboride fine particles is lost.

From the above study, it is confirmed that by using the pulverization medium having a Vickers hardness of about ⅓ to ½ of the Vickers hardness of hexaboride fine particles, the assembly of hexaboride fine particles having a predetermined aspect ratio can be efficiently produced.

Specifically, for example, Vickers hardness of the lanthanum hexaboride, which is a preferred example of the hexaboride, is 2770 kg/mm$^2$. However, the hardness of the pulverization medium suitable for efficiently producing the assembly of the hexaboride lanthanum fine particles of the present invention is about 920 kg/mm$^2$ to 1850 kg/mm$^2$. That is, zirconia beads (1100 kg/mm$^2$ to 1300 kg/mm$^2$), alumina beads (1000 kg/mm$^2$ to 1100 kg/mm$^2$) and the like are suitable. On the other hand, the hardness of glass beads (about 550 kg/mm$^2$) is too low, and the hardness of silicon carbide beads (about 2300 kg/mm$^2$) and diamond beads (about 7000 kg/mm$^2$) is too high, and therefore they are not suitable.

Further, a bead mill is more suitable for a mill used for producing the assembly of the hexaboride fine particles as described above than a ball mill, a three-roll mill, and a sand mill. The ball mill, the three-roll mill, and the sand mill are often used to produce non-spherical particles (usually flat scaly particles) of metals or metal compounds such as aluminum and nickel. However, since the hexaboride fine particles generally have very high hardness and rigidity and hardly cause plastic deformation, it may be very difficult to process hexaboride spherical fine particles into non-spherical particles by plastic deformation.

As described above, the method for producing the assembly of the hexaboride fine particles of the present invention has been described. The abovementioned manufacturing method is merely an example, and the hexaboride fine particles produced by a wet-type process capable of controlling shape can be used, or the hexaboride fine particles produced by a plasma torch method capable of controlling the shape can also be used. In any case, when the assembly of the hexaboride fine particles is finally formed, and when the particle shape of the hexaboride fine particles contained in the assembly is regarded as a spheroid body, the number ratio of the hexaboride fine particles contained in the assembly and having an aspect ratio [(long axis length)/(short axis length)] of 1.5 or more and less than 4.0 is expressed as a (number) %, and the number ratio of hexaboride fine particles contained in the assembly and having an aspect ratio [(long axis length)/(short axis length)] of 4.0 or more and less than 20.0 is expressed as b (number) %, 60 (number) %≤(a+b) (number) %≤100 (number) %, and a:b=20:80 to 80:20 are satisfied. Such a method can be suitably used.

The average particle size of the fine particles contained in the assembly of the hexaboride fine particles of the present invention is preferably 200 nm or less. This is because when the average particle size is 200 nm or less, light is not completely shielded by scattering when it is formed into a hexaboride fine particle dispersed body described later, visibility in the visible light region is maintained, and at the same time transparency can be efficiently maintained.

In the hexaboride fine particles of the present invention, in particular, when the transparency in the visible light region is emphasized, it is preferable to further consider reduction of scattering due to the hexaboride fine particles.

When reduction of scattering due to the hexaboride fine particles is taken into consideration, the average particle size of the hexaboride fine particles is preferably 100 nm or less. This is because when the dispersed particle size of the hexaboride fine particles is small, scattering of light in the visible light region with a wavelength of 400 nm to 780 nm due to geometric scattering or Mie scattering is reduced. As a result of the reduction of the scattering of the light, it is possible to avoid a situation in which the hexaboride fine particle dispersed body described later becomes like a frosted glass, and clear transparency cannot be obtained:

This is because when the average particle size of the hexaboride fine particles is 100 nm or less, the geometric scattering or the Mie scattering is reduced and the Rayleigh scattering region is formed. In the Rayleigh scattering region, the scattered light is reduced in inverse proportion to the sixth power of the particle size, so that the scattering is reduced as the average particle size of the hexaboride fine particles is decreased and the transparency is improved. Furthermore, when the average particle size of the hexaboride fine particles is 50 nm or less, the scattered light is extremely small, which is preferable. From a viewpoint of avoiding scattering of the light, it is preferable that the average particle size of the hexaboride fine particles is small, and when the average particle size is 1 nm or more, industrial production is easy.

It is preferable that the surface of the hexaboride fine particles is coated with an oxide containing at least one element selected from Si, Ti, Zr, and Al, because weather resistance can be further improved.

[d] Hexaboride Fine Particle Dispersion and a Method for Producing the Same

The hexaboride fine particle dispersion of the present invention can be obtained by dispersing the assembly of the hexaboride fine particles of the present invention in a liquid medium.

Hereinafter, a method for producing a hexaboride fine particle dispersion will be described. In the present invention, the hexaboride fine particle dispersion may be simply referred to as "a dispersion liquid" in some cases.

By adding the assembly of the hexaboride fine particles of the present invention and optionally an appropriate amount of a dispersant, a coupling agent, a surfactant and the like to a liquid medium and performing dispersion treatment thereto, the hexaboride fine particle dispersion of the present invention can be obtained. The medium of the hexaboride fine particle dispersion is required to have a function for maintaining the dispersibility of the hexaboride fine particle dispersion and the later-described hexaboride fine particle dispersed body described later, and function for not allowing a defect to be generated when the hexaboride fine particle dispersion is used.

(1) Medium

The medium is selected from water, organic solvent, oil and fat, liquid resin, liquid plasticizer, or a mixture of two or more selected from them, to thereby produce the hexaboride fine particle dispersion. As the organic solvent satisfying the above requirements, various ones such as alcohol type, ketone type, hydrocarbon type, glycol type, water type and the like can be selected. Specifically, alcohol solvents such as methanol, ethanol, 1-propanol, isopropanol, butanol, pentanol, benzyl alcohol and diacetone alcohol; ketone solvents such as acetone, methyl ethyl ketone, 3-methyl propyl ketone, methyl isobutyl ketone, cyclohexanone and isophorone; ester-type solvents such as methyl-methoxy-propionate; glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate; amides such as formamide, N-methylformamide, dimethylformamide, dimethylacetamide and N-methyl-2-pyrrolidone; aromatic hydrocarbons such as toluene and xylene; and halogen hydrocarbons such as ethylene chloride and chlorobenzene, can be mentioned. Among them, organic solvents having low polarity are preferable, and in particular, isopropyl alcohol, ethanol, 1-methoxy-2-propanol, dimethylketone, methyl ethyl ketone, methyl isobutyl ketone, toluene, propylene glycol monomethyl ether acetate, and N-butyl acetate are preferable. These solvents may be used alone or in combination of two or more.

As the liquid resin, methyl methacrylate or the like is preferable. As a liquid plasticizer for plastics, plasticizers which are compounds of monohydric alcohols and organic acid esters, plasticizers which are ester type such as polyhydric alcohol organic acid ester compounds, phosphorus such as organic phosphoric acid type plasticizer, etc., are given as preferable examples. Among them, triethylene glycol di-2-ethyl hexanoate, triethylene glycol di-2-ethyl butyrate and tetraethylene glycol di-2-ethyl hexionate are more preferable because of their low hydrolyzability.

(2) Dispersant, Coupling Agent, and Surfactant

The dispersant, the coupling agent and the surfactant can be selected according to the purpose of use, but it is preferable to have a group containing amine, a hydroxyl group, a carboxyl group, or an epoxy group as a functional group. These functional groups are adsorbed on the surface of the hexaboride fine particles, prevent the aggregation of the hexaboride fine particles, and have an effect of homogeneously dispersing the hexaboride fine particles even in the hexaboride fine particle dispersed body described below.

Examples of the dispersant that can be preferably used include a phosphoric ester compound, a polymeric dispersant, a silane coupling agent, a titanate coupling agent, an aluminum coupling agent, and the like, but are not limited thereto. Examples of the polymer dispersant include an acrylic polymer dispersant, a urethane polymer dispersant, an acrylic block copolymer polymer dispersant, a polyether dispersant, a polyester polymer dispersant, and the like.

The amount of the dispersant to be added is preferably in a range of 10 parts by weight to 1000 parts by weight, and more preferably in a range of 20 parts by weight to 200 parts by weight based on 100 parts by weight of the assembly of the hexaboride fine particles. When the amount of the dispersant added falls within the above range, the aggregation of the hexaboride fine particles does not occur in the liquid, and a dispersion stability is maintained.

The method of dispersion treatment can be arbitrarily selected from publicly known methods as long as the hexaboride fine particle assembly is homogeneously dispersed in the liquid medium, and it is possible to use methods such as bead mill, ball mill, sand mill, ultrasonic dispersion, etc.

In order to obtain a homogeneous hexaboride fine particle dispersion, various additives and dispersants may be added or the pH may be adjusted.

(3) Hexaboride Fine Particle Dispersion

The content of the hexaboride fine particles in the above-mentioned hexaboride fine particle dispersion is preferably 0.02 mass % to 20 mass %. When the content is 0.02 mass % or more, it can be suitably used for production of a coating film or a molded plastic body described below, and when the content is 20 mass % or less, industrial production is easy. 0.5% by mass or more and 20% by mass or less is more preferable.

The hexaboride fine particle dispersion of the present invention in which such hexaboride fine particles are dispersed in the liquid medium is placed in an appropriate transparent container and the transmittance of light is measured as a function of the wavelength using a spectrophotometer. The hexaboride fine particle dispersion of the present invention has excellent optical properties optimal for the laminated transparent base material using the hexaboride fine particle dispersed body, the infrared absorptive glass, and the infrared absorptive film described later, namely, having a main absorption peak in the vicinity of roughly 850 to 1300 nm wavelength wherein the ratio of a light absorbance at the absorption peak position to the light absorbance in the wavelength 550 nm [(absorbance of the light at the absorption peak)/(absorbance at the wavelength 550 nm)] is 5.0 or more and 12.0 or less.

In this measurement, the transmittance of the hexaboride fine particle dispersion is easily adjusted by diluting it with a dispersion solvent or an appropriate solvent compatible with the dispersion solvent.

[e] Hexaboride Fine Particle Dispersed Body and a Method for Producing the Same

The hexaboride fine particle dispersed body is composed of the hexaboride fine particles and a thermoplastic resin or a UV curable resin.

The thermoplastic resin is not particularly limited, but preferably includes:

one kind of resin selected from the resin group of polyethylene terephthalate resin, polycarbonate resin, acrylic resin, styrene resin, polyamide resin, polyethylene resin, vinyl chloride resin, olefin resin, epoxy resin, polyimide resin, fluororesin, ethylene vinyl acetate copolymer, polyvinyl acetal resin;

a mixture of two or more kinds of resins selected from this resin group; or a copolymer of two or more kinds of resins selected from this resin group.

On the other hand, although there is no particular limit as the UV curable resin, for example an acrylic UV curable resin can be suitably used.

The amount of the hexaboride fine particles dispersed and contained in the hexaboride fine particle dispersed body is preferably 0.001% by mass or more and 80.0% by mass or less, and more preferably 0.01% by mass or more and 70% by mass or less. When the hexaboride fine particles are less than 0.001% by mass, it is necessary to increase the thickness in order to obtain an infrared shielding effect requiring the hexaboride fine particle dispersed body, and when the hexaboride fine particles are contained exceeding 80% by mass, the ratio of the thermoplastic resin component in the hexaboride fine particle dispersed body is decreased and the strength may be decreased in some cases.

From a viewpoint of obtaining the infrared shielding effect by the hexaboride fine particle dispersed body, the content of the hexaboride fine particles per unit projected area included in the hexaboride fine particle dispersed body is 0.01 $g/m^2$ or more and 0.5 $g/m^2$ or less. Incidentally, the "content per unit projected area" corresponds to a weight (g) of the hexaboride fine particles contained in a thickness direction of the hexaboride fine particle dispersed body of the present invention per unit area ($m^2$) through which light passes.

The hexaboride fine particle dispersed body can be processed into a sheet shape, a board shape or a film shape, and can be applied to various uses.

A method for producing the hexaboride fine particle dispersed body will be described below.

The hexaboride fine particle dispersion is mixed with the thermoplastic resin or the plasticizer and thereafter the solvent component is removed, to thereby obtain a hexaboride fine particle dispersion powder (hereinafter sometimes simply referred to as a dispersion powder) which is a dispersed body in which the hexaboride fine particles are dispersed at a high concentration in the thermoplastic resin and/or the dispersant, or the dispersion (hereinafter sometimes simply referred to as a plasticizer dispersion) in which the hexaboride fine particles are dispersed in the plasticizer at a high concentration. As a method for removing the solvent component from the hexaboride fine particle dispersion, it is preferable to dry the hexaboride fine particle dispersion under reduced pressure. Specifically, the hexaboride fine particle dispersion is dried under depressurization while stirring the hexaboride fine particle dispersion, to separate the dispersion powder or the plasticizer dispersion from the solvent component. As a device used for the depressurized drying, a vacuum agitating type dryer can be mentioned, but it is not particularly limited as long as it is an apparatus having the above function. Further, a pressure value at the time of depressurization in the drying step is appropriately selected.

By using the depressurized drying method, removal efficiency of the solvent from the hexaboride fine particle dispersion liquid is improved, and the hexaboride fine particle dispersion powder and the plasticizer dispersion are not exposed to a high temperature for a long time, and therefore the agglomeration of the hexaboride fine particles dispersed in the dispersion powder or in the plasticizer dispersion does not occur, which is preferable. Further, productivity of the hexaboride fine particle dispersion powder and the hexaboride fine particle plasticizer dispersion is increased, and an evaporated solvent can be easily recovered, which is preferable from a viewpoint of environmental consideration.

In the hexaboride fine particle dispersion powder or the hexaboride fine particle plasticizer dispersion obtained after the drying step, the residual solvent is preferably 5% by mass or less. This is because when the residual solvent is 5% by mass or less, bubbles are not generated when the hexaboride fine particle dispersion powder or hexaboride fine particle plasticizer dispersion is processed into, for example, the laminated transparent base material using the hexaboride fine particle dispersed body described later, and an outer appearance and optical properties are satisfactorily maintained.

In addition, a master batch can be obtained by dispersing the hexaboride fine particle dispersion or the hexaboride fine particle dispersion powder in the resin and pelletizing the resin.

Further, the master batch can also be obtained by homogeneously mixing the hexaboride fine particle dispersion and the hexaboride fine particle dispersion powder, with a powdery or pelletized thermoplastic resin, and with other additive as needed, and thereafter extruding the mixture by a vented single or twin screw extruder, and processing it into a pellet by a method of cutting general melt-extruded strands. In this case, as the shape thereof, a cylindrical or prismatic shape can be mentioned. It is also possible to use a so-called hot cut method of directly cutting melt extrudates. In this case, the cut material generally has a spherical shape.

[f] Sheet-Like or Film-Like Hexaboride Fine Particle Dispersed Body and a Method for Producing the Same By homogeneously mixing the hexaboride fine particle dispersion powder, the hexaboride fine particle dispersion or the master batch into the transparent resin, the hexaboride fine particle dispersed boy having a sheet shape, a board shape or a film shape of the present invention can be produced. From the hexaboride fine particle dispersed body having the sheet shape, the board shape or the film shape, the laminated transparent substrate using the hexaboride fine particle dispersed body, the infrared absorptive film, and the infrared absorptive glass can be produced.

When the hexaboride fine particle dispersed body having a sheet shape, the board shape or the film shape is produced, various thermoplastic resins can be used for the resin constituting the sheet or the film. The hexaboride fine particle dispersed body having the sheet shape, the board shape or the film shape is preferably a thermoplastic resin having sufficient transparency.

Specifically, it is preferable to use the resin selected from the resin group such as polyethylene terephthalate resin, polycarbonate resin, acrylic resin, styrene resin, polyamide resin, polyethylene resin, vinyl chloride resin, olefin resin, epoxy resin, polyimide resin, fluororesin, ethylene, and vinyl acetate copolymer, or a mixture of two or more kinds of resins selected from this resin group, or a copolymer of two or more kinds of resins selected from this resin group.

Further, when a hexaboride fine particle dispersed body having the sheet shape, the board shape, or the film shape is used as an intermediate layer, and when the thermoplastic resin constituting the board or the film alone does not have a sufficient flexibility or adhesion to the transparent base material, for example, when the thermoplastic resin is polyvinyl acetal resin, the plasticizer is preferably further added.

As the plasticizer, a substance used as the plasticizer for the thermoplastic resin of the present invention can be used. For example, as the plasticizer used for the infrared absorptive film composed of polyvinyl acetal resin, plasticizers which are compounds of monohydric alcohols and organic acid esters, plasticizers which are ester type such as polyhydric alcohol organic acid ester compounds, and plasticizers which are phosphoric acid type such as an organic phosphoric acid type plasticizer, are given. Both plasticizers are preferably in a liquid state at room temperature. Among them, a plasticizer which is an ester compound synthesized from a polyhydric alcohol and a fatty acid is preferable.

After the hexaboride fine particle dispersion powder or the hexaboride fine particle dispersion or the masterbatch, thermoplastic resin and optionally plasticizer and other additives are kneaded, the kneaded product is extruded by an extrusion molding method, an injection molding method or the like, and it is possible to produce, for example, a sheet-like hexaboride fine particle dispersed body formed in a flat or curved state.

Known methods can be used for forming the sheet-like or film-like hexaboride fine particle dispersed body. For example, a calendar roll method, an extrusion method, a casting method, an inflation method, or the like can be used.

[g] Laminated Transparent Base Material Using the Hexaboride Fine Particle Dispersed Body and a Method for Producing the Same Explanation is given for a laminated transparent base material using the hexaboride fine particle dispersed body which is formed by interposing the sheet-like, the board-like or the film-like hexaboride fine particle dispersed body between a plurality of transparent base materials composed of a material such as glass plate or plastic as an intermediate layer.

The laminated transparent base material using the hexaboride fine particle dispersed body is obtained by interposing the intermediate layer from both sides thereof using the transparent base material. As the transparent base material, a transparent plate glass in a visible light region, a plate-like plastic, a board-like plastic, or a film-like plastic is used. The material of the plastic is not particularly limited and can be selected according to the purpose of use, and as examples thereof, polycarbonate resin, acrylic resin, polyethylene terephthalate resin, PET resin, polyamide resin, vinyl chloride resin, olefin resin, epoxy resin, polyimide resin, fluorine resin, and the like can be used.

The transparent base material using the hexaboride fine particle dispersed body of the present invention can also be obtained by integrally laminating a plurality of opposed transparent base materials, with the sheet-like, the board-like, or the film-like hexaboride fine particle dispersed body of the present invention interposed therebetween by a publicly-known method.

As the optical property of the sheet-like, the board-like, or the film-like hexaboride fine particle dispersed body or a light absorption structure of the present invention, the following point can be realized: when a visible light transmittance is 70%, a minimum value (minimum transmittance) in the transmittance in a light wavelength region of 850 to 1300 nm wavelength is 35% or less.

Here, it is easy to adjust the visible light transmittance to 70% by adjusting an addition amount of the abovementioned assembly of the hexaboride fine particles, dispersion powder, plasticizer dispersion, or master batch and further the film thickness of the film or the sheet, etc., when adjusting a concentration of the assembly of the hexaboride fine particles contained in the hexaboride fine particle dispersion, the dispersion powder, the plasticizer dispersion, or the master batch, and a resin composition.

[h] Infrared Absorptive Film and Infrared Absorptive Glass and a Method for Producing the Same By forming the coating layer containing the assembly of the hexaboride fine particles on at least one surface of the transparent substrate selected from a substrate film or a substrate glass, using the hexaboride fine particle dispersion described above, an infrared absorptive film or an infrared absorptive glass can be produced.

The abovementioned hexaboride fine particle dispersion is mixed with plastic or monomer to prepare a coating liquid, and a coating film is formed on the transparent base material by a known method, thereby producing an infrared absorptive film or an infrared absorptive glass.

For example, the infrared absorptive film can be prepared as follows.

A medium resin is added to the abovementioned hexaboride fine particle dispersion to obtain a coating liquid. After the coating liquid is applied on the surface of a film base material, a solvent is evaporated and the resin is cured by a predetermined method, it becomes possible to form a coating film in which the assembly of the hexaboride fine particles is dispersed in the medium.

As the medium resin of the coating film, for example, a UV curing resin, a thermosetting resin, an electron beam curing resin, a room temperature curing resin, a thermoplastic resin and the like can be selected according to the purpose of use. Specifically, polyethylene resin, polyvinyl chloride resin, polyvinylidene chloride resin, polyvinyl alcohol resin, polystyrene resin, polypropylene resin, ethylene vinyl acetate copolymer, polyester resin, polyethylene terephthalate resin, fluorine resin, polycarbonate resin, acrylic resin, or polyvinyl butyral resin can be mentioned.

These resins may be used alone or in combination. However, among the media for the coating layer, it is particularly preferable to use the UV curable resin binder from a viewpoint of productivity and equipment cost.

It is also possible to use a binder using a metal alkoxide. As the metal alkoxide, alkoxides such as Si, Ti, Al, Zr and the like are representative. The binder using these metal alkoxides can be hydrolyzed/polycondensed by heating or the like to form a coating layer composed of an oxide film.

In addition to the above method, the coating layer may be formed by applying a hexoboride fine particle dispersion on the substrate film or the substrate glass and thereafter applying a binder thereon using the medium resin or the metal alkoxides.

Incidentally, the abovementioned film base material is not limited to the film shape, and it may be, for example, the board shape or the sheet shape. As the film base material, PET, acrylic, urethane, polycarbonate, polyethylene, ethylene vinyl acetate copolymer, vinyl chloride, fluorine resin and the like can be used according to various purposes of use. However, as the infrared absorptive film, a polyester film is preferable, and a PET film is more preferable.

The surface of the film base material is preferably subjected to a surface treatment in order to realize easy adhesion of the coating layer. Further, in order to improve the adhesion between the glass substrate or the film base material and the coating layer, it is also preferable to form an intermediate layer on the glass substrate or on the film base material, and form a coating layer on the intermediate layer. The constitution of the intermediate layer is not particularly limited, and it can be constituted by, for example, a polymer film, a metal layer, an inorganic layer (for example, an inorganic oxide layer of silica, titania, zirconia or the like), or an organic/inorganic composite layer.

The method for providing the coating layer on the substrate film or the substrate glass is not particularly limited as long as it is a method capable of uniformly coating the hexaboride fine particle dispersion on the surface of the substrate. For example, a bar coating method, a gravure coating method, a spray coating method, a dip coating method, and the like can be mentioned.

For example, according to the bar coating method using a UV curable resin, the coating film can be formed on the substrate film or the substrate glass using a wire bar having a bar number that can satisfy the purpose of forming a target thickness of the coating film and a target content of the hexaboride fine particles, by applying the coating liquid in which a liquid concentration and the additives are suitably adjusted to have appropriate leveling properties on the substrate film or the substrate glass. Then, the solvent contained in the coating liquid is removed by drying and thereafter the coating liquid is irradiated with UV-ray so as to be cured, thereby forming the coating layer on the substrate film or the substrate glass. At this time, the drying condition of the coating film varies depending on the ingredients, the kind of the solvent and the use ratio, but usually it is about 20 seconds to 10 minutes at a temperature of 60° C. to 140° C. Ultraviolet irradiation is not particularly limited, and a UV exposure machine such as an extra-high pressure mercury lamp can be suitably used, for example.

In addition, it is possible to manipulate the adhesion between the substrate and the coating layer, the smoothness of the coating film at the time of coating, the drying property of the organic solvent and the like by the steps before and after the formation of the coating layer. As the steps before and after the formation of the coating layer, for example, the steps of surface treatment of the substrate, a pre-bake (pre-heating of the substrate), a post bake (post-heating of the substrate), and the like can be mentioned and appropriately selected. The heating temperature in the pre-baking step and/or the post-baking step is preferably 80° C. to 200° C., and the heating time is preferably 30 seconds to 240 seconds.

The thickness of the coating layer on the substrate film or on the substrate glass is not particularly limited, but in practice it is preferably 10 μm or less, and more preferably 6 μm or less. This is because, when the thickness of the coating layer is 10 μm or less, sufficient pencil hardness is exerted to exhibit abrasion resistance, and additionally, at the time of volatilization of the solvent in the coating layer and curing of the binder, occurrence of abnormality in the steps such as warping of the substrate film, etc., can be avoided.

The optical properties of the manufactured infrared absorptive film and the infrared absorptive glass are such that when the visible light transmittance is 70%, the minimum value (minimum transmittance) at the transmittance in the light wavelength region of 850 to 1300 nm is 35% or less. In addition, it is easy to adjust the visible light transmittance to 70%, by adjusting the concentration of the hexaboride fine particles in the coating liquid or adjusting the film thickness of the coating film.

For example, the content of the assembly of the hexaboride fine particles per unit projected area included in the coating layer is preferably 0.01 g/m² or more and 0.5 g/m² or less.

EXAMPLES

Hereinafter, the present invention will be specifically described with reference to examples, but the present invention is not limited to these examples.

In the optical properties of the film of this example, the transmittance of light in the wavelength range of 300 nm to 1600 nm was measured at intervals of 5 nm using a spectrophotometer (U-4100 manufactured by Hitachi, Ltd.). The visible light transmittance was measured in accordance with JIS R 3106.

Then, a wavelength where the absorbance of the film of this example is maximum (described as "absorption peak wavelength" in this specification in some cases), and a half-value width at an absorption peak having the absorption peak wavelength (described as a "full width at half maximum" in this specification in some cases) in the wavelength range of 380 nm to 1600 nm, were obtained using an absorbance curve calculated by a method described later.

The particle size was measured with a particle size distribution meter (Nanotrac UPA manufactured by Nikkiso Co., Ltd.).

When the absorption peak wavelength and the full width at half maximum thereof were determined, an evaluation was performed in the wavelength range of 380 nm to 1600 nm in the measurement range of the optical properties ranging from 300 nm to 1600 nm described above. This is because, first, the light absorption properties in the wavelength range of 300 nm to 380 nm has almost no relation to the optical properties as the infrared ray absorbing material of the film of this example. Secondly, the light absorption properties in this range are hardly changed even when there is a difference in shape and distribution of hexaboride fine particles.

Example 1

10 parts by weight of fine particles of lanthanum hexaboride ($LaB_6$) particles (average particle size 1 to 3 μm, and sometimes described as "hexaboride α" in the present specification), 80 parts by weight of toluene, 10 parts by weight of a dispersant (acrylic polymer dispersant having an amino group) were mixed to prepare 3 kg of a slurry. This slurry was charged into the bead mill together with the beads, and the slurry was circulated and pulverized and dispersed for 30 hours.

The used bead mill was a horizontal cylindrical annular type (manufactured by Ashizawa Co., Ltd.), and the material of an inner wall of a vessel and a rotor (rotary stirring part) was $ZrO_2$. As the beads, beads made of YSZ (Yttria-Stabilized Zirconia:yttria-stabilized zirconia) having a diameter of 0.3 mm were used. Then, pulverization and dispersion processing was performed at a slurry flow rate of 1 kg/minute.

In addition, by setting the rotation speed of the rotor at 6 m/sec and making it slower than usual producing conditions, it was possible to control the destruction mode of the hexaboride α and to control the assembly of the hexaboride fine particles contained in the fine particle dispersion of the hexaboride α in such a manner that when the number ratio of the hexaboride fine particles having an aspect ratio of 1.5 or more and less than 4.0 was expressed as a (number) %, and the number ratio of the hexaboride fine particles having an aspect ratio of 4.0 or more and less than 20.0 was expressed as b (number) %, 60 (number) %≤(a+b) (number) %≤100 (number) % and a:b=20:80 to 80:20 were satisfied.

The average dispersed particle size of the hexaboride α in the obtained hexaboride α dispersion (sometimes referred to as "dispersion A" in the present specification) was measured and found to be 25 nm.

A dried body of the dispersion A was observed by three-dimensional image analysis using TEM tomography.

Figure 1:
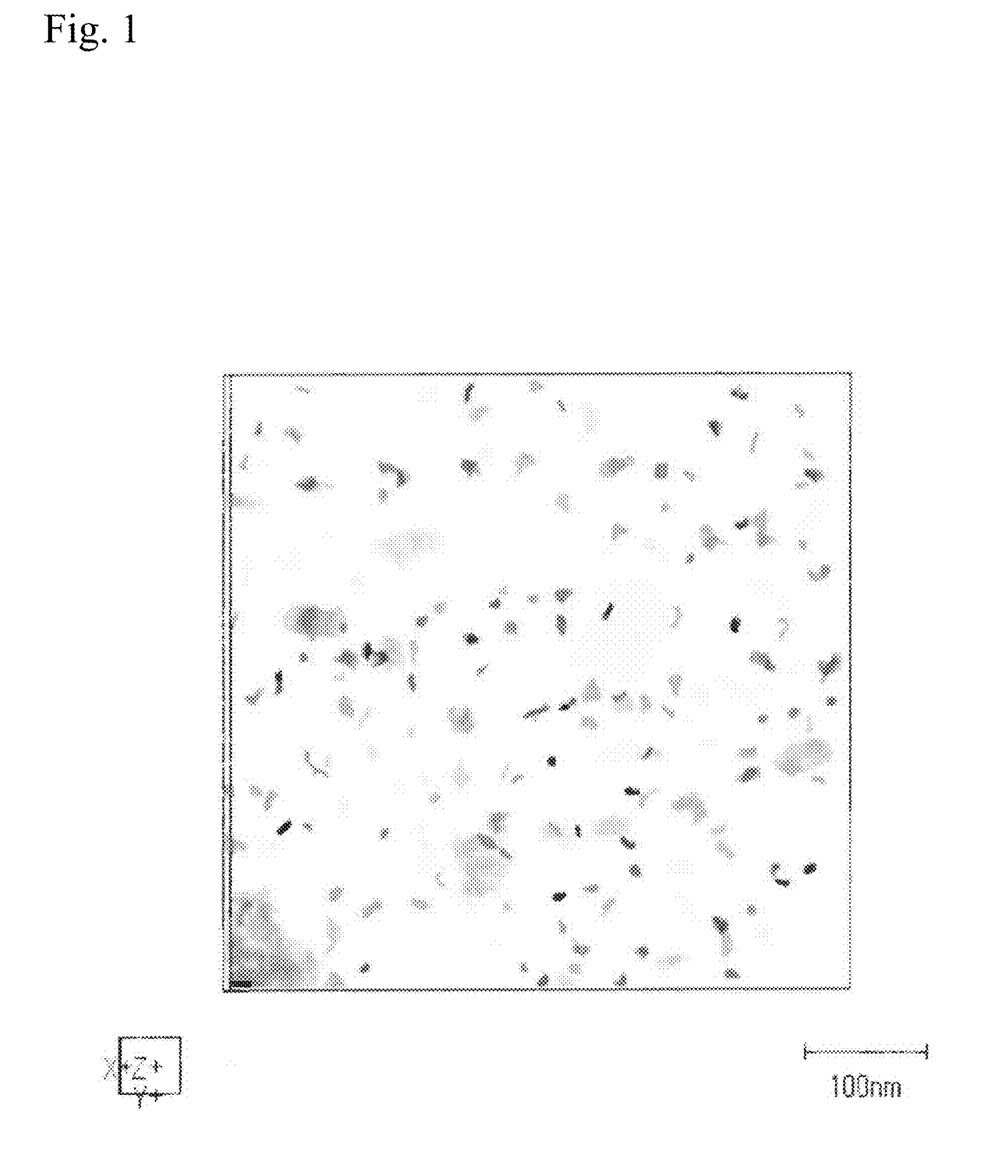
FIG. 1 is a TEM tomography image of an assembly dispersed in a lanthanum hexaboride fine particle-dispersed body according to example 1.

First, FIG. 1 shows an example of an image in which the shape of hexaboride present on the cross-section is drawn in a cross-sectional area of 500 nm square, from a three-dimensional image of hexaboride α-dispersed body obtained by TEM tomography.

Figure 2:
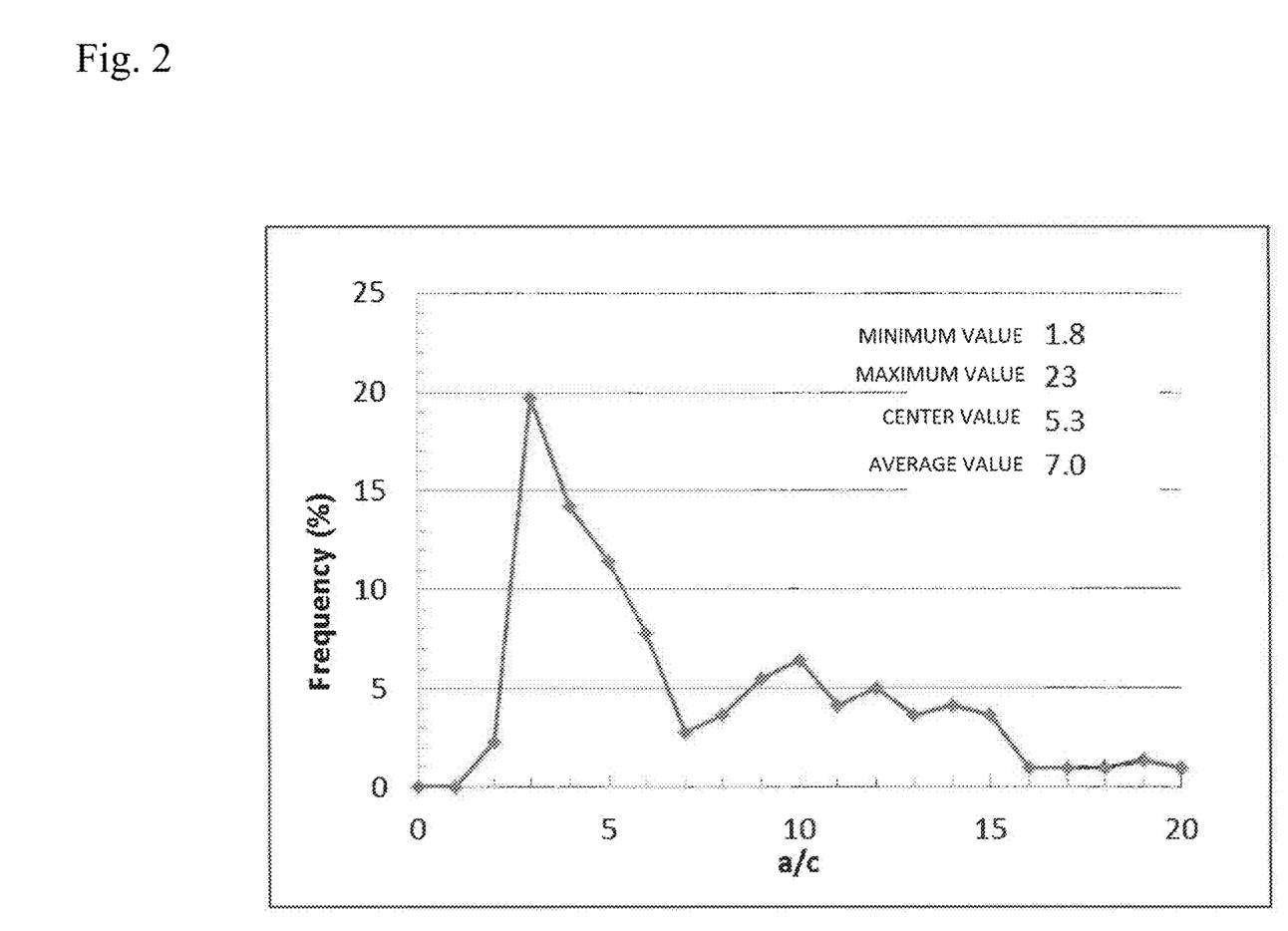
FIG. 2 shows a frequency distribution of an aspect ratio of hexaboride fine particles contained in the assembly dispersed in the lanthanum hexaboride fine particle-dispersed body according to example 1.

Next, a three-dimensional image of 218 hexaboride α particles was analyzed, and the frequency distribution of the aspect ratio was measured. The results are shown in FIG. 2. Here, in FIG. 2, the horizontal axis represents the aspect ratio value and the vertical axis represents an existence frequency value.

According to the above measurement, it was found that 36.2 (number) of hexaboride α fine particles having the aspect ratio of 1.5 or more and less than 4.0, and 63.3 (number) % of hexaboride α fine particles having the aspect ratio of 4.0 or more and less than 20.0, were contained in the dispersion A.

Next, the optical properties of the dispersion A were measured. Specifically, the procedure was as follows.

In the dispersion A, toluene was added so that the concentration of hexaboride α was 0.002 mass %, diluted, mixed, and shaken well. Thereafter, the diluted solution was placed in a glass cell having an optical path length of 1 cm, and its transmittance curve was measured with a spectroscope. At this time, the baseline of the spectroscope was pulled with a sample filled with toluene in the same glass cell. Then, the transmittance curve was converted into an absorption curve by the following equation 1.

$$A(\lambda) = -\log 10(T(\lambda)/100) \quad \text{Formula 1}$$

Wherein, A (λ) is an absorption curve showing that the absorbance A depends on a wavelength λ, and T (λ) is a transmittance curve showing that the transmittance depends on a wavelength λ.

As a result, the absorption peak wavelength of the dispersion A according to example 1 was 985 nm, and the full width at half maximum of the absorption peak was 400 nm. The obtained absorption curve is shown by a solid line in FIG. 3.

Comparative Example 1

The assembly of spherical lanthanum hexaboride fine particles (sometimes referred to as "fine particle β" in the present specification) having a value of the aspect ratio [(long axis length)/(short axis length)] of 1.0 or more and 1.5 or less when the particle shape was approximated as a spheroid body, was prepared.

Figure 4:
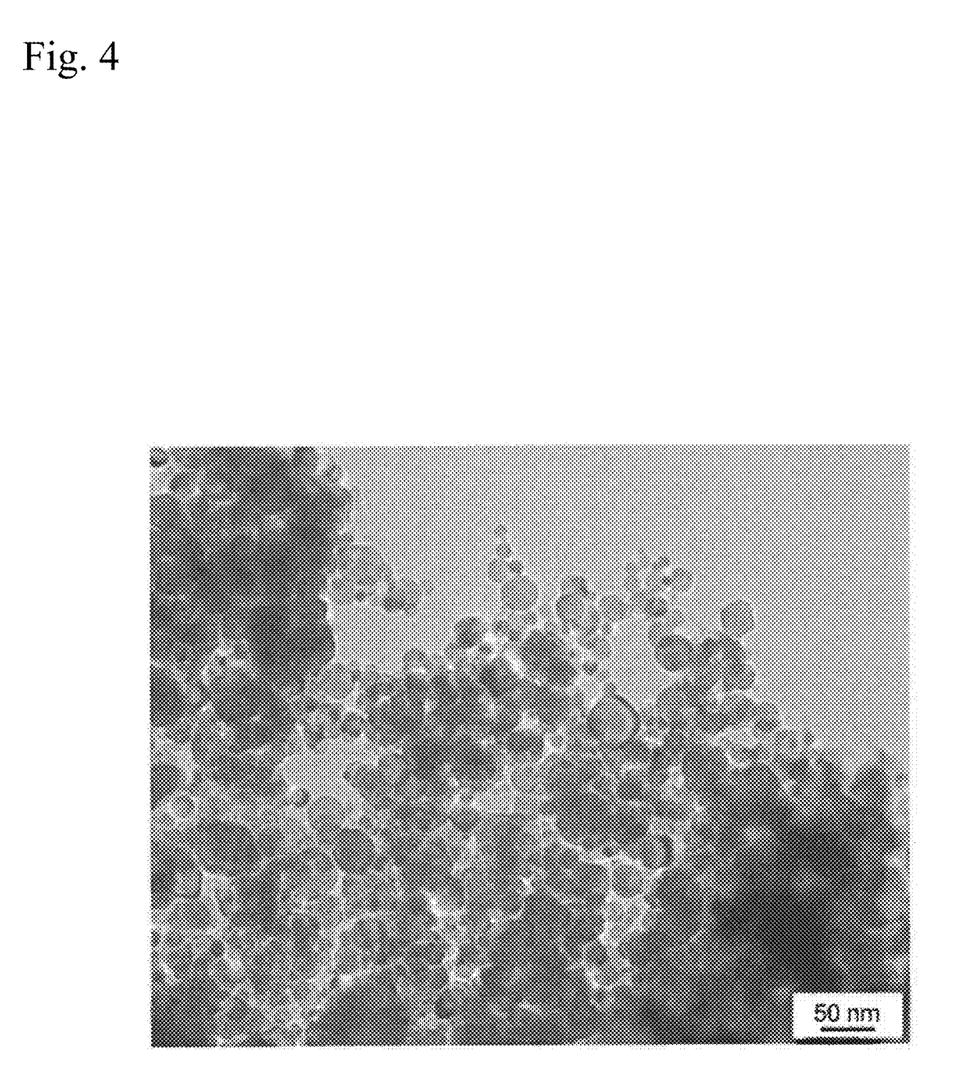
FIG. 4 is a TEM image of the lanthanum hexaboride fine particles at 30000 times according to comparative example 1.

Fine particle β is a single phase of lanthanum hexaboride. FIG. 4 shows a TEM image of 30000 times magnification of the fine particle β.

10 parts by weight of fine particles β, 80 parts by weight of toluene and 10 parts by weight of dispersant (acrylic polymer dispersant having amino group) were mixed to prepare 3 kg of slurry. This slurry was charged into a medium stirring mill together with beads, and the slurry was circulated and pulverized and dispersed for 10 hours to obtain a dispersion (sometimes referred to as "dispersion B" in the present specification).

The medium stirring mill used was a horizontal cylindrical annular type (manufactured by Ashizawa Co., Ltd.), and the material of the inner wall of the vessel and the rotor (rotary stirring part) was $ZrO_2$. For the beads, beads made of YSZ having a diameter of 0.3 mm were used. The rotation speed of the rotor was 13 m/sec, and the pulverization and dispersion treatment was performed at a slurry flow rate of 1 kg/min.

The average dispersed particle size of the hexaboride fine particles in the obtained dispersion B was measured to be 29 nm.

Next, the same operation as the dispersion A in example 1 was performed, and the optical properties of the dispersion B in comparative example 1 were measured.

As a result, the absorption peak wavelength of the dispersion B of comparative example 1 was 760 nm, and the full width at half maximum of the absorption peak was 160 nm. The obtained results are shown by broken lines in FIG. 3.

Example 2

10 parts by weight of the hexaboride α fine particles used in example 1, 80 parts by weight of toluene and 10 parts by weight of a dispersant (acrylic polymer dispersant having amino group) were mixed to prepare 3 kg of a slurry. This slurry was charged into the bead mill together with the beads, and the slurry was circulated and pulverized and dispersed for 50 hours.

The used bead mill was a horizontal cylindrical annular type (manufactured by Ashizawa Co., Ltd.), and the material of the inner wall of the vessel and the rotor (rotary stirring part) was $ZrO_2$. For the beads, beads made of YSZ having a diameter of 0.3 mm were used. Pulverization and dispersion treatment was performed at a slurry flow rate of 1 kg/minute.

By setting the rotation speed of the rotor at 4 m/sec and making it slower than usual producing conditions, it is possible to control the destruction mode of hexaboride α, and to control the assembly of the hexaboride fine particles contained in the fine particle dispersion of the hexaboride α in such a manner that when the number ratio of the hexaboride fine particles having an aspect ratio of 1.5 or more and less than 4.0 was expressed as a (number) %, and the number ratio of the hexaboride fine particles having an aspect ratio of 4.0 or more and less than 20.0 was expressed as b (number) %, 60 (number) %≤(a+b) (number) %≤100 (number) % and a:b=20:80 to 80:20 were satisfied.

The average dispersed particle size of hexaboride α in the obtained hexaboride α dispersion (sometimes referred to as "dispersion C" in the present specification) was measured and found to be 23 nm.

The dried body of the dispersion C was observed by three-dimensional image analysis using TEM tomography in the same manner as in example 1. As a result, it was found that 26.9 (number) % of hexaboride α fine particles having an aspect ratio of 1.5 or more and less than 4.0, and 72.5 (number) % of hexaboride α fine particles having an aspect ratio of 4.0 or more and less than 20.0 were contained in the dispersion C.

Next, the optical properties of the dispersion C were measured. Specifically, the procedure was as follows.

In dispersion C, toluene was added so that the concentration of hexaboride α was 0.002 mass %, diluted, mixed, and shaken well. Thereafter, the diluted solution was placed in a glass cell having an optical path length of 1 cm, and its transmittance curve was measured with a spectroscope. At this time, the baseline of the spectroscope was pulled with a sample filled with toluene in the same glass cell. Next, the same operation as in the dispersion A in example 1 was performed, and the optical properties of the dispersion C in example 2 were measured. As a result, the absorption peak wavelength of the dispersion C of example 2 was found to be 1055 nm, and the full width at half maximum of the absorption peak was found to be 410 nm.

CONCLUSION

Figure 3:
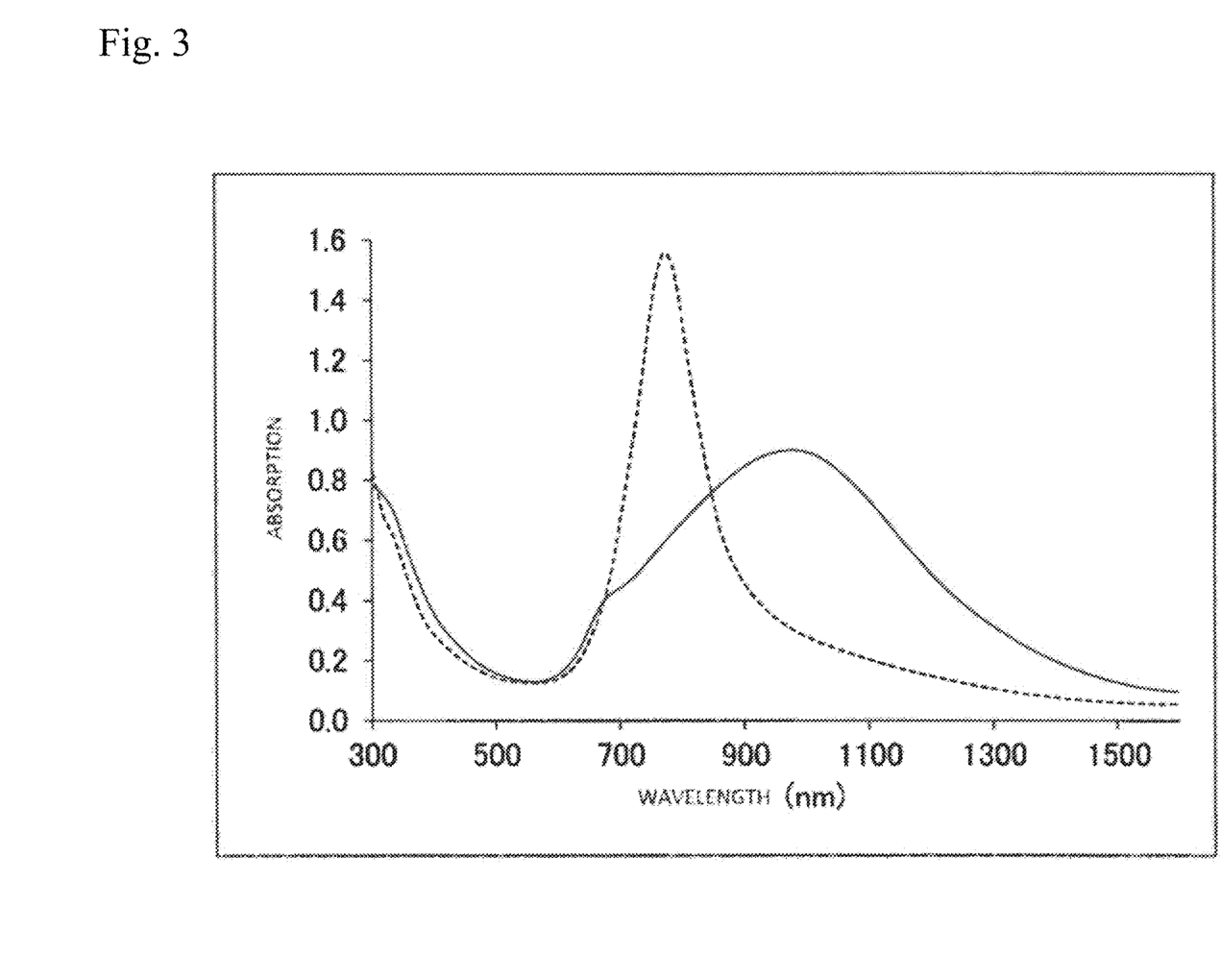
FIG. 3 is a graph showing optical properties of a dispersion according to an example and a comparative Example.

From the results in FIG. 3, it was found that dispersion A of example 1 containing 36.2 (number) % of hexaboride α fine particles having an average dispersed particle size of 21 nm and an aspect ratio of 1.5 or more and less than 4.0, and 63.3 (number) % of hexaboride α fine particles having an aspect ratio of 4.0 or more and less than 20.0, has a wide range of near-infrared absorption with a peak at a wavelength of 985 nm corresponding to near infrared, and good solar radiation shielding characteristic was exerted. Also, dispersion C of example 2 containing 26.9 (number) % of hexaboride α fine particles having an average dispersed particle size of 23 nm and an aspect ratio of 1.5 or more and less than 4.0, and 72.5 (number) % of hexaboride α fine particles having an aspect ratio of 4.0 or more and less than 20.0, also exerted a similar solar radiation shielding characteristic.

In contrast, dispersion B of comparative example 1 containing hexaboride fine particles having an average dispersed particle size of 27 nm and an aspect ratio of 1.0 or more and 1.5 or less, was located at a wavelength of 760 nm where the absorption peak corresponds to visible light, and the full width at half maximum was also small. That is, although it had a sharp absorption near the wavelength of 700 to 800 nm, the absorption of near infrared light in the region longer than the wavelength of 800 nm was weak. Therefore, compared with the dispersions A and C of examples 1 and 2, the solar radiation shielding characteristic was inferior.

The invention claimed is:

1. A method of producing an assembly of hexaboride particles, comprising:
  pulverizing the hexaboride particles having an average particle size of 0.5 to 5 μm by a wet beads mill using beads having a Vickers hardness of ⅓ to ½ with respect to a Vickers hardness of the hexaboride particles, wherein
  the pulverizing by the wet beads mill is performed for 30 to 50 hours, and
  a ratio of the number of the hexaboride particles contained in the assembly and having an aspect ratio [(long axis length)/(short axis length)] of 1.5 or more and less than 4.0 is expressed as variable a (the number of particles) %, a ratio of the number of the hexaboride particles contained in the assembly and having an aspect ratio [(long axis length)/(short axis length)] of 4.0 or more and less than 20.0 is expressed as a variable b (the number of particles) %, the aspect ratio [(long axis length)/(short axis length)] obtained based on a spheroid of the hexaboride particles, conditions of 60%≤the sum of the variables (a+b) %≤100% and a ratio of the variables a:b=20:80 to 80:20 are satisfied in the assembly.

2. The method of producing an assembly of hexaboride particles according to claim 1, wherein the hexaboride particles are lanthanum hexaboride particles, and the beads are zirconia beads or alumina beads.

3. The method of producing an assembly of hexaboride particles according to claim 1, wherein the beads are made of yttria-stabilized zirconia having a diameter of 0.3 mm.

4. The method of producing an assembly of hexaboride particles according to claim 1, wherein the hexaboride particles are pulverized with an acrylic polymer dispersant having an amino group by the wet beads mill.

5. The method of producing an assembly of hexaboride particles according to claim 1, wherein a dispersion solvent used in the wet beads mill is an organic solvent selected from the group consisting of isopropyl alcohol, ethanol, 1-methoxy-2-propanol, dimethyl ketone, methyl ethyl ketone, methyl isobutyl ketone, toluene, propylene glycol monomethyl ether acetate, and n-butyl acetate.

* * * * *